United States Patent Office 3,570,069
Patented Mar. 16, 1971

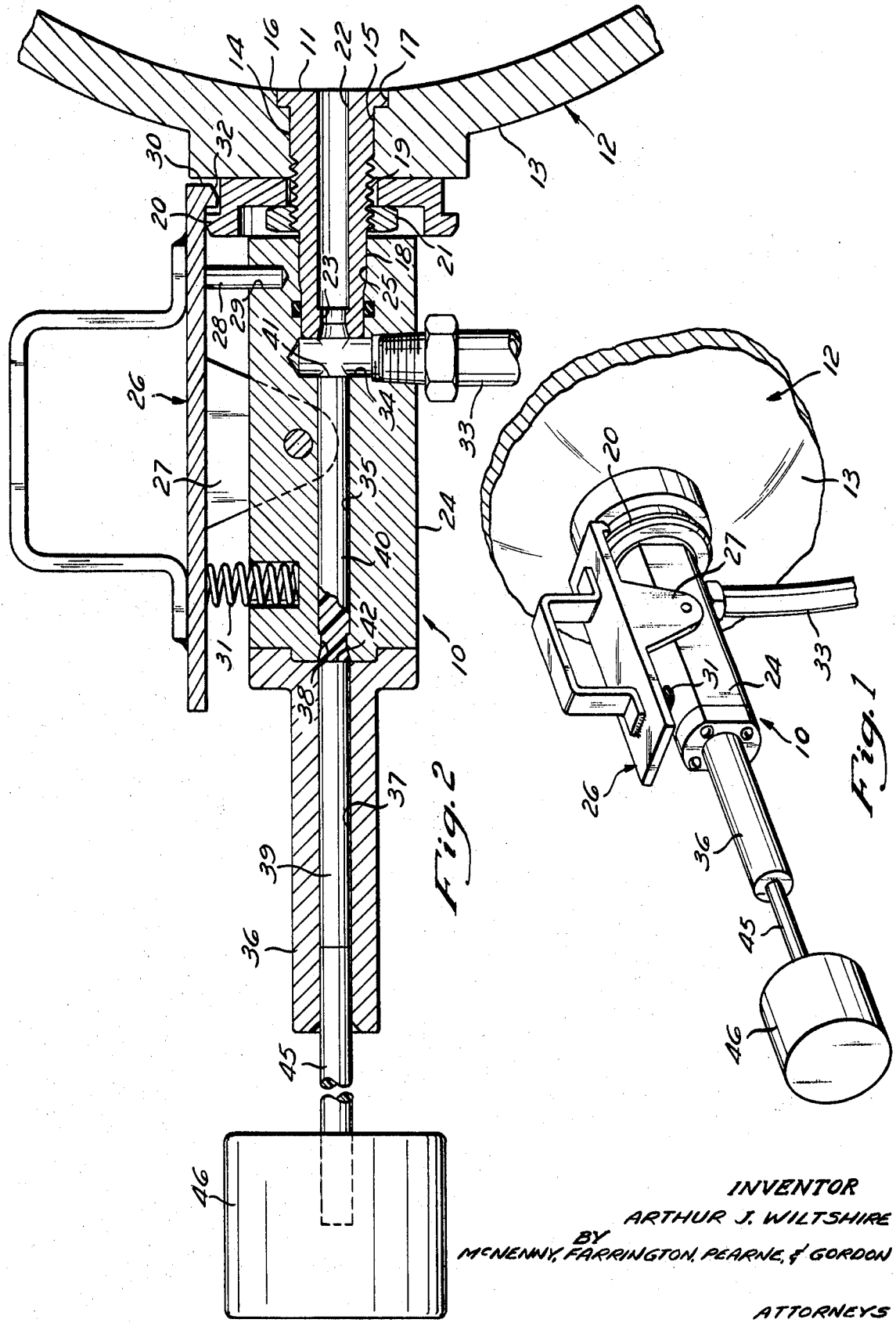

3,570,069
APPARATUS FOR INJECTING MOLDABLE MATERIAL INTO A MOLD
Arthur J. Wiltshire, Cleveland, Ohio, assignor to Structural Fibers, Inc., Chardon, Ohio
Filed July 11, 1968, Ser. No. 744,042
Int. Cl. B29f 1/00
U.S. Cl. 18—30    5 Claims

ABSTRACT OF THE DISCLOSURE

Apparatus for connecting a source of resinous material to be molded to an inlet fitting on a mold and for inserting a plug in the fitting before the source of resinous material is disconnected from the fitting. The connecting and plug-inserting device includes a block having a resin inlet port which is connected to a source of resinous material, a resin outlet port which is connected to the mold fitting, and a passageway for guiding a plug through the resin outlet port and into the inlet fitting to block the inlet fitting after a measured amount of resin is delivered to the mold cavity.

BACKGROUND OF THE INVENTION

This invention relates to the art of molding fiber-reinforced, plastic articles by laying up a fibrous reinforcing form within a hollow mold which defines the outside surface of the article to be molded, inserting a fluid-expansible membrane within the form, inflating the membrane, and then injecting a measured amount of resin into the fibrous form. Such a technique is set forth in detail in U.S. Reissue Pat. No. 25,241 to Randolph, U.S. Pat. No. 3,137,898 to Geringer, and U.S. Pat. No. 3,138,507 to Wiltshire. According to the molding techniques set forth in those patents, a measured amount of resin is pumped into a fiber-filled mold cavity under pressure. The mold cavity is defined by a rigid outer mold surface and an inflatable bag. The amount of resin introduced is such that the charge will permeate the entire fiber lining in the mold during a subsequent bag pressurizing operation, and, preferably, a slight excess of resin is provided so that the resin in the fiber matting will drive out all the air. The air and then the excess resin are forced out of the mold through ducts in the mold casing by gradually increasing the pressure in the inflatable bag to a maximum molding pressure required to compress the fiber matting so as to produce a desirable high fiber-to-resin ratio in the final product.

In order to introduce the measured amount of resin into the mold cavity, each mold is provided with a resin inlet fitting to which a resin delivery conduit is coupled. After the desired amount of resin has been delivered to the mold cavity, the coupling is removed from the inlet fitting and the inlet fitting is pegged with, for example, a wooden peg.

Although this technique has been successfully employed in the manufacture of fiber-reinforced plastic articles, the step of injecting resin into the mold cavity involves certain problems, some of which adversely affect the characteristics of the completed article. One such problem is the tendency of the injected resin to be forced out of the mold after the resin coupling has been removed from the inlet fitting and before the inlet fitting is pegged. The resin expressed from the inlet fitting changes the predetermined fiber-to-resin ratio of the molded article and also increases the problem of plant maintenance. In a plant employing liquid resin and fibrous reinforcing material as raw materials, plant personnel find it annoying to track through pools of liquid resin and then through areas of fibrous material. Thus, it is important to maintain a clean plant.

A further problem involved in the resin injecting operation is the problem of improper mold pegging or pegging with defective pegs. Since the charged molds are conveyed through a hot water bath to raise the temperature of the mold to set the resin, improper pegging of the molds and/or defective pegs permit the resin to be expressed from the mold cavity as the temperature of the mold is raised. Such loss of resin may result in a defective molded article. Moreover, the water bath tank must be drained periodically so that the resin build-up in the bottom of the tank may be removed.

SUMMARY OF THE INVENTION

The apparatus according to the present invention overcomes many of these prior art resin injection problems by providing apparatus which will plug the resin inlet opening in a mold before the resin delivery conduit is disconnected from the resin inlet fitting. Furthermore, and in accordance with the teachings of this invention, a deformable plug or peg having "plastic memory" is employed so that when such a plug is forced into a narrowed passage portion of the resin inlet fitting, it will tend to return to its original cross section to tightly seal the resin inlet opening.

In accordance with the teachings of this invention, a device for coupling a resin source to a mold cavity through a resin inlet fitting and for plugging the resin inlet fitting after a measured amount of resin has been delivered under pressure to the mold cavity comprises a block having a passage extending therethrough. An intersecting passage is connected to a source of resin. Plastic plugs are fed into one end of the through passage and seal that portion of the through passage against resin leakage. The other end of the through passage is connected to a resin inlet fitting on the mold. After a measured amount of resin has been charged into the mold cavity and while the through passage is in communication with the resin inlet fitting, a push rod is employed to push a portion of one of the pegs out of the through passage and into the resin inlet fitting. The through passage is then removed from the inlet fitting and from the remaining portion of the peg. In this manner, the inlet opening is pegged before the inlet opening is disconnected from the source of resin.

The resin inlet fitting has a reduced cross sectional portion so that the deformable peg is extruded into and forms a tight fit with the inlet opening.

BRIEF DESCRIPTION OF THE DRAWINGS

FIG. 1 is a perspective view of a device according to this invention, showing the device coupled to a resin inlet fitting on a mold.

FIG. 2 is a fragmentary, longitudinal cross section of the device and fitting illustrated in FIG. 1.

DETAILED DESCRIPTION OF THE DRAWINGS

In the drawing, there is illustrated a coupling device 10 for connecting a resin source (not shown) to a resin inlet fitting 11 which is provided on a portion of a mold 12. The portion of the mold 12 may comprise a bottom end cap 13 of the type illustrated and described in Pat. No. 3,138,507 to Wiltshire.

The fitting 11 has a cylindrical body portion 14 which extends through a bore 15 in the bottom casing cap 13. One end of the fitting 11 has a flange 16 which is received in an annular recess 17 in the casing cap 13. The other end of the fitting 11 extends axially out of the opening 15 and has a projecting nipple portion 18 and a threaded portion 19. A nut 20 and a lock nut 21 are threaded onto the portion 19 to securely fasten the fitting 11 onto the cap 13. A resin inlet passageway 22 extends axially through the fitting 11. One end of the passageway 22 is provided with a narrowed throat portion 23. The purpose of the narrowed throat portion 23 will hereinafter become apparent.

The coupling device 10 comprises a main block 24 having a bore 25 at one end thereof which cooperates with the outer surface of the nipple 18. The device 10 is attached to the fitting 11 by pushing the bore 25 onto the nipple 18. The coupling device 10 is held in this position by a latching member 26. The latching member 26 includes downwardly extending ear portions 27 which are pivotally connected to the block 24. A stop pin 28 for the member 26 is affixed to the block 24 by being press fitted into a recess 29 provided in the block 30. There is provided a lip 30 on the front edge of the latch 26 and the lip 30 is normally biased downwardly by a spring 31 which extends between the latch 26 and the block 24. The lip 30 has a sloping front surface 32 which, when engaged by the nut 20, causes the lip 30 to be raised so that the latch snaps over the nut 20 to hold the device 10 securely on the nipple 18.

When the bore 25 is in place on the nipple 18, a source of pressurized resin is in fluid communication with the interior of the mold 12 through a flexible conduit 33, a resin inlet port 34, and the pasageway 22.

A peg delivery passageway 35 is provided in the block 24 and is in axial alignment with the bore 25 and the passageway 22 in the fitting 11. A guide block 36 is fixed to one end of the block 24 and has a guide passageway 37 in axial alignment with the passageway 35. The passageway 37 is separated from the passageway 35 by a narrowed neck portion 38. The purpose of the narrowed neck portion 38 will hereinafter be explained.

With the device 10 in the position illustrated in the drawings, a measured amount of resin flows from a resin source, through the flexible line 33, the port 34, the conduit 22, and into the mold cavity. After the required amount of resin has been fed into the mold cavity, the resin pumping means is deactivated so that no more resin enters the mold. A peg 40 is then driven into the passageway 22 until its forward end 41 reaches the end of the passageway 22. The peg 40 is driven in this manner by an identical peg 39 which has a forward end 42 butting against the peg 40. The peg 40 is driven into the passageway 22 and the peg 39 is driven to the position illustrated as being occupied by the peg 40 by a push rod 45. The rod 45 is provided with head 46 so that the rod 45 may be advanced by hand and so that the stroke of the rod 45 is limited before the end of the rod 45 reaches the narrowed neck portion 38.

The neck portion 38 tightly grips the peg 40 so that a seal is formed between the peg 40 and the block 24 to prevent any resin from flowing back through and out of the passageway 37. Similarly, the narrowed neck portion 23 provided in the fitting 11 provides a tight seal between the fitting 11 and the peg in the passageway 22 so that resin will not flow out of the mold cavity.

The invention is not restricted to the slavish imitation of each and every detail set forth above. Obviously, devices may be provided which change, eliminate, or add certain specific features without departing from the scope of the invention.

What is claimed is:

1. A device for coupling a resin source to a mold cavity through a resin inlet fitting and for plugging the resin inlet fitting and for plugging the resin inlet fitting, comprising a block having a bore at one end for receiving said resin inlet fitting, means defining a passageway in axial alignment with said bore, at least one plastic peg in said passageway, a resin inlet port in said block communicating with said bore and said passageway, and means to drive said peg into said resin inlet fitting after a metered amount of resin has been admitted to said mold, said peg driving means comprising push rod means slidable in said passageway and having a driving end adapted to push said peg into said fitting, said peg being unconnected to said driving end so that said peg remains in said fitting when said block is removed from said fitting.

2. A device according to claim 1 wherein said passageway is provided with a narrowed neck portion.

3. A device according to claim 2 wherein said resin inlet fitting is provided with a narrowed neck portion.

4. A device for coupling a resin source to a mold cavity through a bore in a resin inlet fitting and for blocking the bore in the resin inlet fitting, comprising means defining a resin delivery passageway, means for connecting said passageway to the bore of said inlet fitting, and means for blocking said bore while said passageway is connected to said fitting, said blocking means comprising a deformable peg and push rod means having a driving end adapted to push said peg into and through said resin delivery passageway and into said bore, said peg being adapted to be driven by said driving end of said push rod means but being unconnected thereto so that said peg may remain in said bore when said passageway is removed from said fitting.

5. The device according to claim 4 wherein said peg delivery means includes a passageway axially aligned with said resin delivery passageway and wherein said rod means is slidable in said passageway to drive said peg into the bore of said resin inlet fitting.

References Cited

UNITED STATES PATENTS

| | | | |
|---|---|---|---|
| 2,702,563 | 2/1955 | Snyder et al. | 251—319X |
| 3,299,475 | 1/1967 | Carlson et al. | 18—30 |

H. A. KILBY, JR., Primary Examiner